United States Patent [19]

Flynn et al.

[11] Patent Number: 5,223,699
[45] Date of Patent: Jun. 29, 1993

[54] RECORDING AND BILLING SYSTEM

[75] Inventors: Lorraine Flynn, Somerset; Chester J. Oldakowski, Jr., Annandale, both of N.J.

[73] Assignee: AT&T Bell Laboratories, Murray Hill, N.J.

[21] Appl. No.: 608,770

[22] Filed: Nov. 5, 1990

[51] Int. Cl.$^5$ .................. G06K 5/00; G06F 15/00; H04M 11/00
[52] U.S. Cl. .................. 235/380; 364/406; 379/91; 379/144
[58] Field of Search .......... 235/380; 364/401, 406, 364/408; 379/114, 144, 91; 358/84

[56] References Cited

U.S. PATENT DOCUMENTS

| | | | |
|---|---|---|---|
| 4,001,550 | 1/1977 | Schatz | 235/379 |
| 4,162,377 | 7/1979 | Mearns | 179/18 D |
| 4,346,442 | 8/1982 | Musmanno | 364/408 |
| 4,472,626 | 9/1984 | Frid | 235/380 |
| 4,707,592 | 11/1987 | Ware | 235/380 |
| 4,791,640 | 12/1988 | Sand | 379/114 |
| 4,831,245 | 5/1989 | Ogasawara | 235/380 |
| 4,851,650 | 7/1989 | Kitade | 235/380 |
| 4,891,503 | 1/1990 | Jewell | 235/380 |
| 4,907,257 | 3/1990 | Asano et al. | 235/380 |
| 4,935,756 | 6/1990 | Hellwarth et al. | 379/114 |

Primary Examiner—Eugene R. LaRoche
Assistant Examiner—Christoher R. Glembocki
Attorney, Agent, or Firm—Barry H. Freedman

[57] ABSTRACT

Each potential user of a telecommunications network is assigned a single credit card containing at least first and second authorization codes, the first code being indicative of status as an authorized user of the telecommunications network and the second code being indicative of status as an authorized purchaser of goods and/or services, as in a conventional credit card. The authorization codes are preferably contained on the card in both human readable form, such as embossed lettering, and in machine readable form, such as magnetic encoding. The validity of the first authorization code is verified to permit access to the telecommunications network. After the telecommunications network has been used to complete a call, billing information including the first billing code that has been recorded locally is transmitted via the telecommunications network to a remote data base in which the second billing code associated with the first billing code is automatically determined in data processing equipment. The processor assembles conventional goods/services related transactions (including cash access transactions at Automated Teller Machines) and complete telecommunications usage information into a combined electronic record, so that a single bill can be rendered to the user.

8 Claims, 4 Drawing Sheets ns**

RECORDING AND BILLING SYSTEM

BACKGROUND OF THE INVENTION

1. Field of the Invention

This invention relates generally to a system for gaining access to, and for recording and billing for usage of a telecommunications network and a credit network arranged for the provision of goods, services, and/or cash, and, more particularly, to an access, recording and billing system intended for use in connection with credit accounts and credit cards issued to potential customers.

2. Description of the Prior Art

As complexities of modern life increase, it becomes more and more desirable to simplify and re-organize the way everyday tasks are accomplished, so that the user can deal with a variety of problems in a consolidated and unified manner. For example, "one statement" banking, a service offered by many financial institutions, combines, in one document, a description of transactions, such as loan payments, savings deposits and withdrawals, and checking transactions that are made by a depositor during the previous reporting period. This obviates the need to receive, sort through, and respond to a multitude of documents at the end of each month. Financial management has been simplified and unified, as for example described in U.S. Pat. No. 4,346,442 issued to Merrill Lynch on Aug. 24, 1982 in which a cash management system removes the burden of transferring assets from the customer, maximizing the financial performance of the funds managed in the account and at the same time minimizing the inconvenience normally attendant with self management.

Where billing for usage of a telecommunications network is concerned, progress has been made along the lines just described. For example, the Southern New England Telephone Company (SNET) has issued a single calling card carrying two account designations, one for making purchases of goods and/or services and the other for making telephone calls, so that a user can avoid the necessity and attendant inconvenience of carrying separate cards for each type of transaction. However, the SNET recording and billing arrangement still renders two separate bills to each account holder, one for telephone calls and the other for goods and/or services. To avoid this problem, other recording and billing arrangements have been devised whereby ordinary credit cards may be utilized to access the telecommunications network. However, such arrangements often necessitate the use of special telephone station apparatus to read magnetically encoded account information directly from the credit card, place a call to a remote data base, and wait for an authorization or other reply. This significantly delays the user, sometimes creating frustration and dissatisfaction. With other arrangements, even if ordinary station apparatus is used to initiate a credit card call, details of the call, such as time, calling and called number, often cannot be made available to the customer when the bill is rendered. In yet other situations, calls are permitted without adequate validation of the credit card number, increasing the possibility of fraud.

SUMMARY OF THE INVENTION

In accordance with the present invention, each potential user of a telecommunications network is assigned a single credit card containing at least first and second authorization/billing codes, the first code being indicative of status as an authorized purchaser of goods and/or services, as in a conventional credit card, and the second code being indicative of status as an authorized user of the telecommunications network. The authorization/billing codes are preferably contained on the card in both human readable form, such as embossed lettering, and in machine readable form, such as magnetic encoding. The access feature of the present invention is arranged so that the validity of the second code is verified at the time the telecommunications network is accessed. After the telecommunications network has been used to complete a call, billing information including the second code that has been recorded locally is transmitted via the telecommunications network to a remote processor and associated database. There, the first code is automatically cross referenced with the second code, so that the processor can assemble information describing both conventional goods/services related transactions (including cash access transaction at Automated Teller Machines) and telecommunications network usage into a single, combined electronic record, so that a unified bill can be rendered to the user.

BRIEF DESCRIPTION OF THE DRAWING

The present invention will be better appreciated by consideration of the following detailed description, when read in light of the accompanying drawing in which.

DETAILED DESCRIPTION

Figure 1:
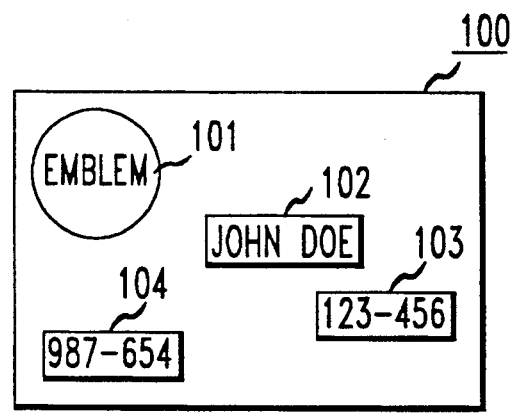
FIGS. 1 and 2 are diagrams illustrating the arrangement of the front and back sides of a credit card useful in conjuncion with the recording and billing arrangement of the present invention.
Figure 2:
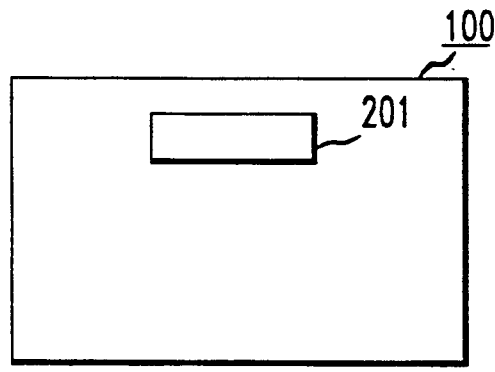

Referring first to FIGS. 1 and 2, there are shown illustrative arrangements for the front and back sides, respectively, of a credit card 100 useful in connection with the present invention. The front side may include one or more areas such as area 101 in which the emblem or trade name of the card issuer or sponsor may be displayed, and a name field 102 in which the name of the individual authorized to use the card is recorded. Conventionally, name field 102 consists of human readable lettering embossed in the surface of the card, so that a mechanical imprint or impression can be made in a paper sales receipt. The front side also includes a first code field 103, which contains a first authorization/billing code, illustratively an alphanumeric sequence, assigned to the authorized user for the purpose of enabling credit card purchases of goods and/or services to be made with the card, and a second code field 104, which contains a second different authorization/billing code assigned to the user for the purpose of enabling access and use of a telecommunications network. It is to be understood that the same card can also be used to make banking transactions, such as obtaining money at an automated teller machine (ATM).

In FIG. 2, the back side of card 100 includes machine readable information area 201, which may include a strip of magnetic material which can be electrically encoded with information associated with the card and its authorized user. Specifically, information area 201 may include the same information as contained in code fields 103 and 104, as well as name field 102. If information area 201 is implemented conventionally, the magnetic strip will be configured to include multiple tracks, each of which is in a predetermined physical location on the card. In this way, the information contained in the various tracks may be read out by transaction terminals located in vendor's premises, or by telephones when the card is used to access a telecommunications network. In conventional arrangements, track 2 includes the credit card information contained in code field 103, formatted in accordance with published ISO or other applicable credit card industry standards. Track 1, in accordance with our invention, includes information relating to both telecommunications network access as contained in code field 104, as well as another copy of the same information as contained in track 2. Alternatively or additionally, information area may include optically scannable information, as described in U.S. Pat. No. 4,001,550 issued to V.L. Schatz on Jan. 4, 1977.

Associated with each card issued to an authorized user is a personal identification number (PIN) consisting of a "secret" code provided only to that user. Knowledge of the PIN is needed to gain access to the telecommunications network. It is a feature of our invention that the same PIN can be used (if required) in a goods/services transaction, or to obtain cash at an ATM. This PIN is not included on card 100 in human readable or magnetically encoded form, so that unauthorized persons who gain physical possession of the card do not have access to the PIN.

Figure 3:
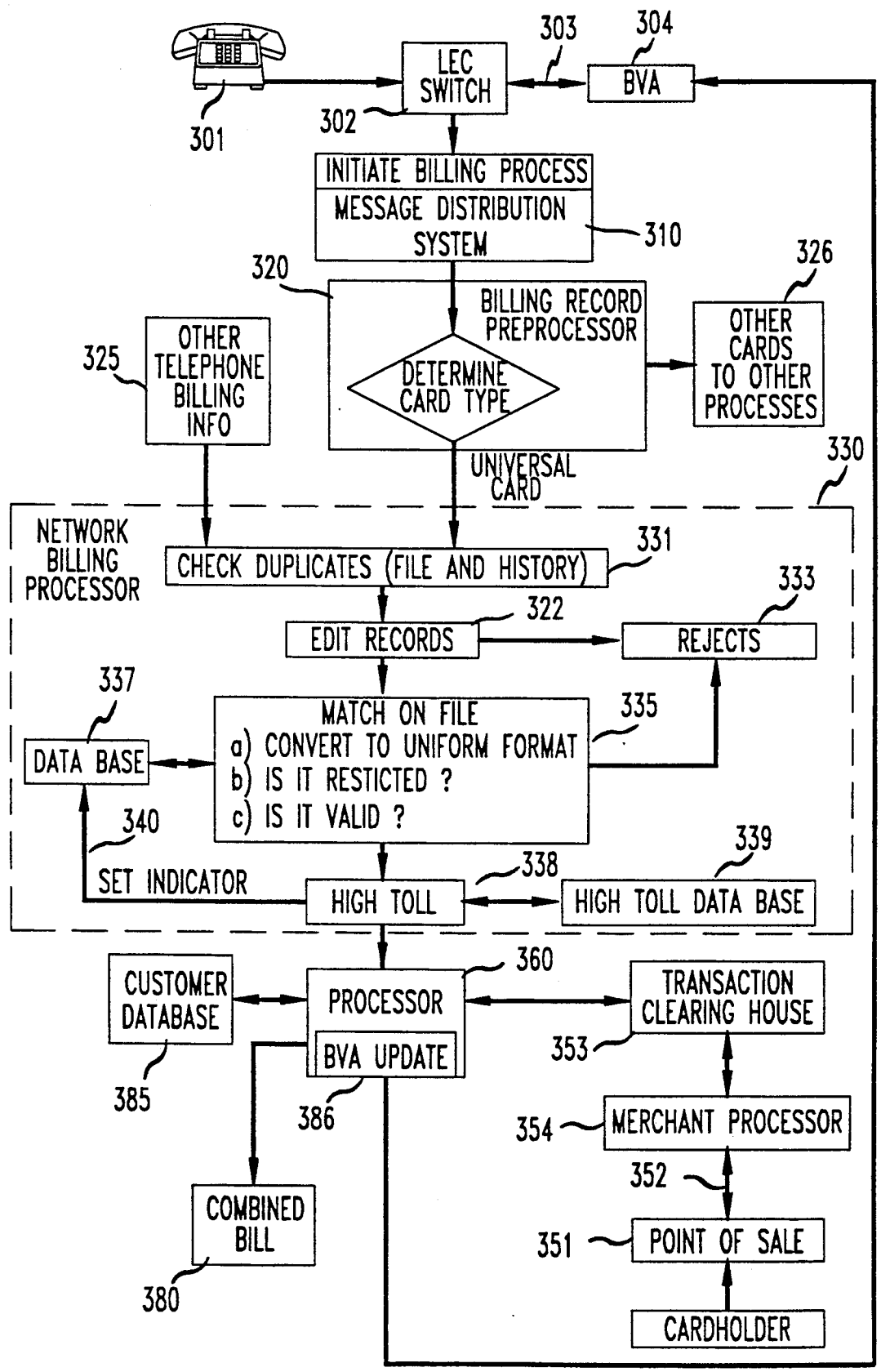
FIG. 3 is an overall block diagram illustrating the interrelationship between a good/services recording and billing network and a telecommunications recording and billing network, arranged in accordance with the present invention.

Referring now to FIG. 3, there is shown an overall block diagram illustrating the interrelationship between a goods and services recording and billing network and a telecommunication services recording and billing network arranged in accordance with the present invention. The goods and services network includes a series of merchant point of sale terminals such as terminal 351 located at sites where holders of credit card 100 may seek to obtain goods and/or services. At each such site, when a transaction is made, electronic information descriptive thereof, including such information as the amount involved, the identity of the merchant involved in the transaction, as well as the information in first authorization code field 103, is collected and electronically transmitted via a communications link 352 to a merchant processor 354 which is arranged to capture the data. If the transaction involves more than a nominal sum and passes a pre-authorization account status check, merchant processor 354 initiates an authorization request in which a customer database 385 associated with processor 360 (described below) is queried to determine if the contemplated transaction meets specified criteria, such as credit limits, payment status, and so on. The query is communicated to database 385 via transaction clearing house 353, also described below. If the transaction is approved, an indication is communicated to the merchant at terminal 351. Thereafter, details of the transaction are stored for further processing. Point of sale terminal 351 may be arranged as shown in FIG. 1A of U.S. Pat. No. 4,472,626 issued to S. R. Frid on Sep. 18, 1984. One technique for performing credit access authorizations is described in U.S. Pat. No. 4,891,503, issued to T. L. Jewell on Jan. 2, 1990. Numerous other authorization procedures are available to those skilled in the art.

As an alternative to electronic transmission of transaction information, certain point of sale terminals may not be capable of communication via communications link 352, but rather may collect the information about the transaction locally and transport it, via hard copy, so that it can be entered locally in merchant processor 354. In this event, the information nevertheless is accumulated in processor 354 and is routed through clearing house 353 and processor 360 and accumulated in a record file maintained in database 385 for the authorized user that participated in the transaction.

Periodically, the transaction information accumulated in merchant processor 354 is communicated to a transaction clearing house 353, which may include another electronic data processor operated, for example, by a bank and association such as Visa or MasterCard. Clearing house 353 assembles billing records for goods/services and cash transactions and forwards them to processor 360, described in more detail below. Communication between clearing house 353 and processor 360 may be via a conventional data link 355, such as the Accunet Packet Switched Network adapted to use X.25 protocol.

Still referring to FIG. 3, a telecommunications billing system illustrated therein enables a plurality of telephones, such as telephone 301 to make credit card telephone calls using credit card 100 of FIG. 1. Telephone 301 is connected to a local exchange carrier (LEC) operator switch 302 located in a central office serving that telephone. When an authorized user of credit card 100 desires to place a call, the second code and the PIN common to the first and second codes assigned to that user may be communicated to switch 302 in several ways. First, if the telephone is equipped with an automatic card reader, the user may insert the card in a slot or opening in the phone, so that information encoded in information area 201 may be extracted and transmitted via the telephone lines to switch 302. A magnetic stripe reader may be used for this purpose, provided that it is adapted to extract encoded information in track 1. During the access process, the caller is prompted to enter his/her PIN, which is usually input using the telephone keypad. Alternatively, the initiation of a telephone call may connect the user to an automatic voice response unit (ARU), such as a Conversant 2 interactive voice unit, which prompts the user to enter the second authorization code and the PIN into the network using the touch tone keys available in the telephone set. Finally, in some instances, the user may communicate the second authorization code and PIN to an operator, who will then enter the information into the network using an interface terminal located in the central office.

In any of the cases described above, before further access to the telecommunications network is enabled, the validity of the second authorization code is checked by comparing the code to a stored list of valid codes. This is accomplished by extending the authorization code via a network illustrated simply as link 303 in FIG. 3 to a processor 304 running a bill verification application (BVA) program. The details of this process are described in U.S. Pat. No. 4,162,377 issued to A. B. Mearns on Jul. 24, 1979. General principles applicable to call charging are described in U.S. Pat. No. 4,791,640 issued to W. C. Sand on Dec. 13, 1988.

If access to the network is permitted, a record of the call is created and transmitted after completion of the call, to a message distribution system 310, which controls the routing of the record and in turn sends the billing record to a billing record preprocessor 320. Typically, a billing record includes information describing the calling and called parties, the beginning time and duration of the call, the class or type of service rendered, and the cost of the call, as well as other information if desired.

Preprocessor 320 examines each billing record to determine if it has been made by the holder of a credit card of the type contemplated by this invention. Transactions associated with other types of cards are accumulated and forwarded to other processors such as processor 326. Transactions selected for further processing are applied to network billing processor 330. In addition, if billing records involving telephone network usage originate from other sources, such as source 325, these records are likewise forwarded to network billing processor 330. These transactions could originate, for example, when credit card 100 is utilized at a pay telephone to make a credit card call using the second authorization code normally intended for obtaining goods and services.

In accordance with the present invention, the billing record generated by usage of the telecommunication network is first processed to check for unnecessary duplications in a database 331, based on a sampling of previous and current billing files. Records are then edited in a processor 332 to assume that a uniform format is maintained. If records cannot be suitably corrected, they are assembled in a rejected file 333 for manual processing.

Valid billing records are next applied to a screening processor 335 which converts each record to a uniform account number format and determines if the account associated with each billing record is listed as restricted or invalid in files maintained in an associated database 337. Records are subsequently applied to a high toll processor 338, which determines if large amounts of network usage have been accumulated for a single account which might indicate unauthorized usage. This occurs in a high toll database 339. If such accounts are identified, an indicator is communicated to database 337 via line 340, so that subsequent transactions involving that account may be restricted appropriately.

After processing of billing records for telecommunications network usage has been completed within processor 330, the records are applied to processor 360 which likewise receives purchases/services billing records from clearing house 354. This processor and an associated customer database 385, is arranged to post communications transactions made using the first authorization code to a series of customer records indexed by a master account number derived from the first authorization code. Periodically, goods/services/cash transactions made using the second authorization code are posted to the appropriate records, by parsing the data received from clearing house 353 to extract an identification code that can be uniquely mapped to a corresponding master account number. In this way, combined billing information for both usage of the telecommunications network as well as for purchases/services is assembled, so that a combined bill 380 may be rendered to the subscriber. Processor 360 may also perform conventional accounting and billing functions.

Processor 360 is also arranged to periodically access over-limit files maintained in database 385, to determine if any account exceeds a credit limit imposed on the subscriber associated with that account. In the event that an overage is detected, a BVA update request 386 is generated to deactivate billing verification application BVA 304. Thus, a subsequent attempt to utilize credit card 100 to access the telecommunications network will be denied. Processor 360 also advantageously communicates information relating to over-limit accounts to clearing house 353, so that further use of the credit card can be halted or monitored.

Figure 4:
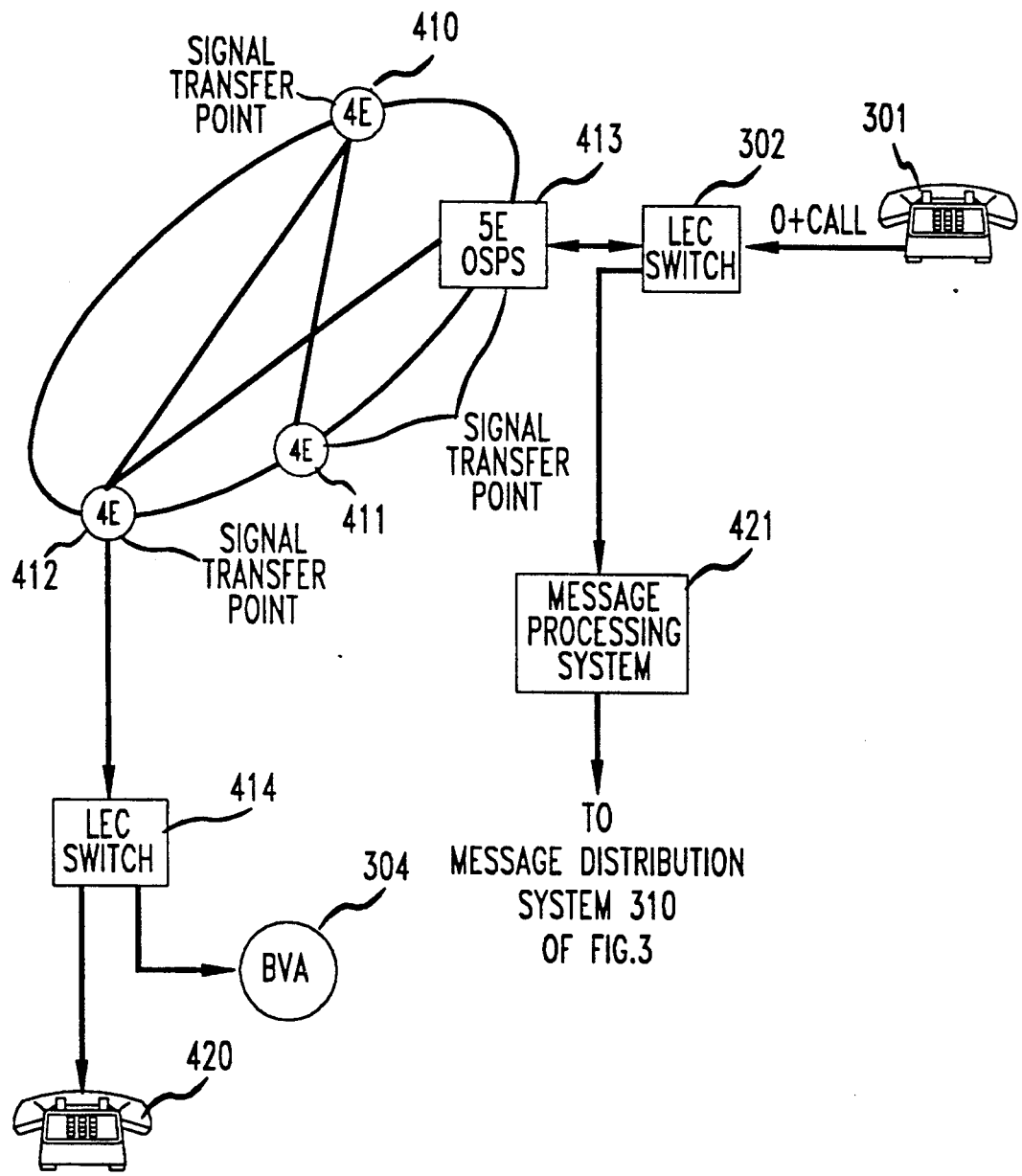
FIG. 4 illustrates the communication process between LEC switch 302 and BVA 304 of FIG. 3, in more detail.

FIG. 4 illustrates the flow of validation and telecommunications recording and billing information between telephone 301 and billing verification application (BVA) 304 of FIG. 3, in more detail. In FIG. 3, this flow is simply illustrated by network connection 303. When a 0+ call is initiated at telephone station 301, the validation process is initiated by extending the call via LEC switch 302 to a network consisting of several signal transfer points 410-413. STP 413 may comprise a #5 electronic Switching System (ESS) acting as an Operator Service Position Switch (OSPS) of the type available from AT&T, while as shown in FIG. 4, STP 410-412 may comprise a #4E-ESS, also available from AT&T. In the illustration of FIG. 4, access to BVA 304, which actually performs validation of the first authorization code and PIN, is obtained in STP 412, via a second LEC switch 414. In other instances, fewer or greater numbers of STPs may be involved in setting up the communications link between the telephone station 301 and the appropriate remotely located BVA.

After the validation process has been performed, the call from telephone 301 may be extended to a destination such as telephone 420 connected to LEC switch 414, or to any other location interconnected in the network of FIG. 4. When the call is initiated, billing information (call message detail) regarding the call is recorded in LEC switch 302. When the call is terminated, an Automatic Message Accounting (AMA) record is created and forwarded, to a message processing system 421, which applies the correct charge amount and taxes, etc., and reformats it into an Exchange Message Interchange (EMI) record. The EMI record is then forwarded to centralized message data system 310 of FIG. 3 for further processing as described above. Details of the EMI protocol are described in the Bell Communications Research Special report, SR-STS 000320 "Exchange Message Interface" Copyright by Bell Communications Research 1986-1989.

Figure 5:
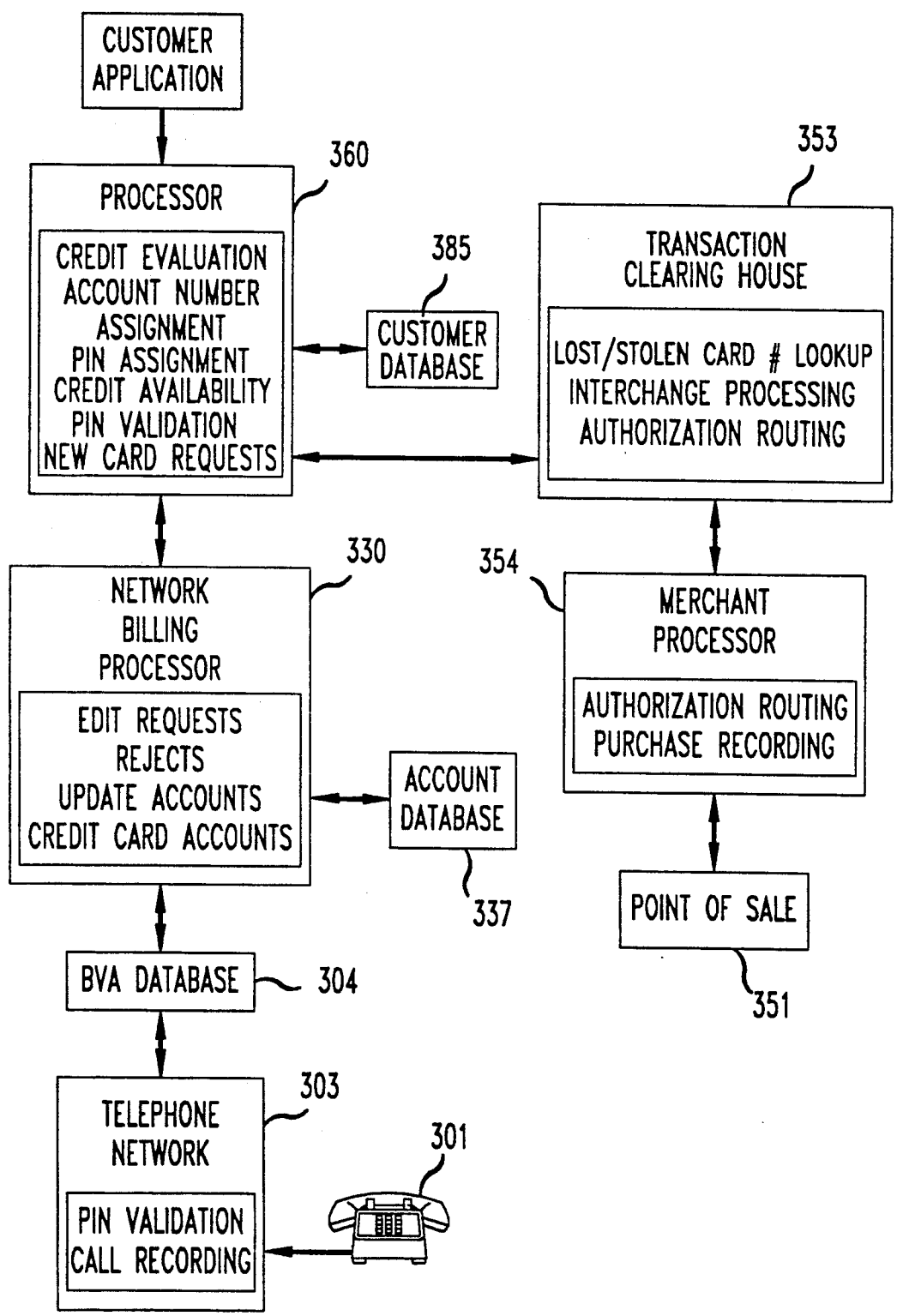
FIG. 5 illustrates the process for obtaining and utilizing a common personal identification number (PIN) in conjunction with the present invention.

The processing of the Personal Identification Number (PIN) assigned to each user of the recording and billing system of the present invention is illustrated in FIG. 5.

With respect to PIN initiation, a request for a PIN assignment is received in processor 360, which uses both the first and second authorization codes to determine a common "valid natural PIN" that meets the limitations and criteria set by both the telecommunications network provider as well as the goods/services/cash providers that are processed in transaction clearing house 353. This PIN is transmitted to, and stored in encrypted form in customer database 385. Processor 360 also sends a "new card request" to network billing processor 330 which edits the request and returns any rejects, via reject file 333, to processor 360 for correction. Verified requests, that is, requests for a PIN that have been validated, are transmitted to account database 337 for storage in an encoded format. Concurrently, the first authorization code and the PIN are added to BVA database 304.

When a user of the recording and billing system contemplated by the present invention desires to utilize the telecommunications network and places a call from a telephone 301, the call is routed through LEC switch 302 and telephone network 303 to the appropriate BVA database 304, depending upon parameters contained within the first authorization code. The BVA is arranged to verify the PIN as well as high-usage indicators provided from BVA update request circuit 386, and to signal LEC switch 302 to proceed with the call and permit access for valid PIN numbers. The call then proceeds and is recorded as described above in conjunction with FIG. 3.

A process similar to that used for a goods/services transactions is used in conjunction with a cash access transaction originating from, for example, an automated teller machine (ATM). Here, the customer may initiate a cash request at point of sale terminal 351 which routes the transaction to merchant processor 354 and thence to transaction clearing house 353. Clearing house 353, in communication with customer database 385, verifies the PIN and authorizes the transaction to proceed, typically debiting the customer's available credit. The authorization to proceed is forwarded back to point of sale terminal 351 in the reverse order, namely from clearing house 353 to merchant processor 354 and thence to point of sale terminal 351.

Various modifications and adaptations of the present invention will be readily apparent to persons of ordinary skill in the art. Accordingly, it is intended that the invention be limited only by the following claims.

We claim:

1. A method of billing for usage of a telephone network, comprising the steps of:
    (a) assigning to an authorized user of said telephone network, a first authorization/billing code, and a second, associated authorization/billing code, said first code being indicative of authorization to use said telephone network, said first code having a format which is accepted as a valid authorization code for use of said telephone network and said second code having a format different from the format of said first authorization code which is accepted as a valid authorization code for obtaining other goods and services;
    (b) storing information including said first code in a first database and storing information including said second code in a second database;
    (c) responsive to the application to said telephone network by said authorized user of information defining said first authorization code indicative of a desire to use said telephone network, verifying the validity of said first authorization code, said verification step including:
        (i) communicating said first code, via said telephone network, to said first database, and
        (ii) analyzing said first code to determine its validity based upon said stored information in said first database;
    (d) responsive to said verifying step, permitting the desired use of said telephone network by said user based upon a determination of the validity of said first authorization code;
    (e) transmitting, after said telephone network is used, call billing information regarding said usage to said second database, said call billing information including said first code but not said second code assigned to said user;
    (f) identifying, in said second database, said second code associated with said first code included in said call billing information, and
    (g) billing the user that was authorized to use said second authorization code, for both said telephone network usage and for any other goods and services obtained by use of said second authorization code.

2. A method of billing for usage of a telephone network and for making of credit transactions, comprising the steps of:
    (a) assigning to each user authorized to use said telephone network and to make credit transactions, a credit card containing first and second authorization codes, said first and second codes uniquely corresponding to each other by virtue of a predetermined association therebetween, said first code having a format which is accepted as a valid authorization code for use of said telephone network and said second code having a format different from the format of said first authorization code which is accepted as a valid authorization code for making credit transactions;
    (b) responsive to the application to said telecommunications network by a particular authorized user of said telephone network of information defining a particular first authorization code indicative of a desire to use said telecommunications network, verifying the validity of said particular first authorization code, said verification step including:
        (i) communicating said particular first authorization code, via said telephone network to a first database, and
        (ii) comparing said particular first authorization code to stored information in said first database to determine its validity;
    (c) responsive to the application to said telephone network by said particular authorized user of information defining a particular second authorization code indicative of a desire to make a credit transaction, verifying the validity of said particular second authorization code, said verification step including:
        (i) communicating said particular second authorization code, via said telephone network to a second database, and
        (ii) comparing said particular second authorization code to stored information in said second database to determine its validity;
    (d) permitting said particular authorized user to use said telephone network if said first authorization code is valid, and permitting said particular authorized user to make a credit transaction if said second authorization code is valid,
    (e) transmitting, after said telephone network is used, call billing information regarding said usage to a processor, said call billing information including said first authorization code;
    (f) transmitting, after said credit transaction is completed, credit information regarding said transaction to said processor, said credit information including said second authorization code;
    (g) in preparation for generation of a bill for said user, cross referencing, in said processor, information associated with said second authorization code, with information associated with the corresponding first authorization code, and (h) billing the user that was authorized to use said first and second authorization codes, for both said telephone network usage and for said credit transaction.

3. A method of joint billing for usage of first and second services, comprising the steps of:

(a) storing in a first processor, information including first codes assigned to authorized users of said first services, and storing in a second processor information including second codes assigned to authorized users of said second services, said first codes having a first format that is accepted as valid authorization to use said first services and said second codes having a second format different from said first format that is accepted as valid authorization to use said second services, each of said first codes corresponding to at least one of said second codes;

(b) allowing use of said first services by a particular user by verifying, at the time said first services are used, the validity of a particular one of said first codes, said verification step including:
(i) communicating said particular first code to said first processor, and
(ii) comparing said particular first code with said stored information to determine the validity of said particular first code;

(c) allowing use of said second services by said particular user by verifying, at the time said second services are used, the validity of a particular one of said second codes, said verification step including:
(i) communicating said particular second code to said second processor, and
(ii) comparing said particular second code with said stored information to determine the validity of said particular second code;

(d) transmitting, after said first service is used, billing information regarding usage of said first service by said particular user to a third processor, said billing information including said particular first code;

(e) transmitting, after said second service is used, billing information regarding usage of said second service by said particular user to said third processor, said billing information including said second code;

(f) retrieving in said third processor, billing information associated with said particular first code and with the corresponding at least one of said second codes; and (g) combining billing information obtained in said retrieving step so as to create a single record for billing said particular authorized user for usage of both said first service and said second service.

4. The method defined in claim 3 further including issuing a credit card to each user, said credit card bearing indicia of said first and second authorization, codes, wherein said communicating steps (b)(i) and (c)(i) are performed by reading said first and second codes from said credit card.

5. The method defined in claim 4, wherein said method further includes affixing to said credit card a magnetic strip capable of storing encoded information representing said first and second authorization codes.

6. The method defined in claim 5, wherein said method further includes:
providing first and second information tracks in said magnetic strip;
storing said first authorization code in said first information track, and storing said second authorization code in said second information track, and
wherein said first verifying step includes reading information from said first information track and said second verifying step includes reading information from said second information track.

7. The method defined in claim 6 wherein said first service is a telecommunications service and said second service includes the furnishing of goods and services.

8. A method of billing for usage of a telephone network, comprising the steps of (a) assigning to each authorized user of said telephone network, a first authorization code, and a second, associated authorization code, said first code being in a proper format indicative of authorization to use said telephone network and said second code being in a proper format different from the format of said first authorization code and indicative of authorization to obtain services other than the use of said telephone network;

(b) validating an authorization code entered by a particular user of said telephone network to determine that said entered authorization code is the same as said first authorization code assigned to said particular user;

(c) responsive to said validating step, permitting said particular user to use said telephone network to obtain telecommunications services for which a charge is imposed on said particular user;

(d) formulating a record of usage of said telephone network by said particular user, said record including information identifying (1) said charge imposed on said particular user for the use of said telephone network, and (2) said first authorization code assigned to said particular user;

(e) transmitting said record of usage to a billing processor; and (f) combining information in said record of usage with information representing charges incurred by said particular user for services obtained by use of the second authorization code assigned to said particular user, to formulate a combined bill for said particular user setting forth charges for said services and for use of said telephone network.

* * * * *